United States Patent
Kang et al.

(10) Patent No.: US 8,203,238 B2
(45) Date of Patent: Jun. 19, 2012

(54) LINEAR MOTOR FOR LINEAR COMPRESSOR

(75) Inventors: Yang-Jun Kang, Changwon-shi (KR); Young-Hoan Jeon, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 49 days.

(21) Appl. No.: 12/448,557

(22) PCT Filed: Jan. 8, 2008

(86) PCT No.: PCT/KR2008/000108
§ 371 (c)(1),
(2), (4) Date: Jun. 25, 2009

(87) PCT Pub. No.: WO2008/084964
PCT Pub. Date: Jul. 17, 2008

(65) Prior Publication Data
US 2010/0084929 A1    Apr. 8, 2010

(30) Foreign Application Priority Data

Jan. 8, 2007 (KR) .................. 10-2007-0002051
Jan. 8, 2007 (KR) .................. 10-2007-0002055

(51) Int. Cl.
*H02K 33/00* (2006.01)
*H02K 35/00* (2006.01)

(52) U.S. Cl. ............. 310/15; 310/30; 310/20; 310/22; 310/24

(58) Field of Classification Search ............. 310/15, 310/30, 20, 22, 24
See application file for complete search history.

(56) References Cited

U.S. PATENT DOCUMENTS

| | | | |
|---|---|---|---|
| 5,389,844 A * | 2/1995 | Yarr et al. | 310/15 |
| 5,495,131 A * | 2/1996 | Goldie et al. | 310/12.15 |
| 5,753,985 A * | 5/1998 | Redlich | 310/36 |
| 5,874,796 A * | 2/1999 | Petersen | 310/156.45 |
| 6,700,230 B1 | 3/2004 | Gokturk | |
| 2002/0039062 A1 | 4/2002 | Kvarnsjo | |
| 2002/0135264 A1* | 9/2002 | Song et al. | 310/254 |
| 2003/0080633 A1* | 5/2003 | Hong | 310/15 |
| 2003/0080634 A1* | 5/2003 | Kwon et al. | 310/15 |
| 2003/0102725 A1* | 6/2003 | Jeon et al. | 310/15 |
| 2003/0102763 A1* | 6/2003 | Park | 310/216 |
| 2004/0108774 A1* | 6/2004 | Yoon et al. | 310/15 |
| 2004/0145248 A1* | 7/2004 | Jung et al. | 310/15 |

(Continued)

FOREIGN PATENT DOCUMENTS

EP    0 954 086    11/1999

(Continued)

*Primary Examiner* — Quyen Leung
*Assistant Examiner* — Alex W Mok
(74) *Attorney, Agent, or Firm* — McKenna Long & Aldridge LLP (57) ABSTRACT

The present invention relates to a linear motor for a linear compressor reciprocating a moving member linearly inside a stationary member to compress refrigerant, and more particularly, to a linear motor for a linear compressor capable of decreasing an iron loss of a flux generated when a current flows in a coil and increasing an inductance. A linear motor for a linear compressor includes an inner stator formed by stacking core blocks in a circumference direction to be insulated from each other, an outer stator formed by arranging core blocks in a circumference direction at a predetermined intervals, and winding a coil around the core blocks, and a plurality of permanent magnets formed between the inner stator and the outer stator with a predetermined gap, and reciprocated linearly due to a mutual electromagnetic force.

14 Claims, 7 Drawing Sheets

U.S. PATENT DOCUMENTS

| | | |
|---|---|---|
| 2004/0207272 A1 | 10/2004 | Kawano et al. |
| 2004/0245863 A1* | 12/2004 | Hong et al. ............... 310/14 |
| 2005/0057101 A1* | 3/2005 | Nakagawa et al. ......... 310/12 |
| 2006/0017332 A1* | 1/2006 | Kang et al. ............... 310/15 |
| 2006/0018771 A1* | 1/2006 | Song et al. ............... 417/416 |
| 2006/0091737 A1* | 5/2006 | Lee et al. ................ 310/15 |
| 2006/0145546 A1* | 7/2006 | Yoon ...................... 310/15 |
| 2006/0145562 A1* | 7/2006 | Nakayama ................. 310/218 |
| 2006/0192441 A1* | 8/2006 | Yoon et al. .............. 310/15 |
| 2007/0069591 A1* | 3/2007 | LeFlem ................... 310/12 |

FOREIGN PATENT DOCUMENTS

| | | |
|---|---|---|
| JP | 59-076409 | 5/1984 |
| JP | 2001-128434 | 5/2001 |
| JP | 2003-116261 | 4/2003 |
| JP | 2006-325400 | 11/2006 |
| WO | WO 00/62406 A1 | 10/2000 |
| WO | WO 2006/025620 | 3/2006 |

* cited by examiner

LINEAR MOTOR FOR LINEAR COMPRESSOR

TECHNICAL FIELD

This application is a 35 USC §371 national stage entry of International Application No. PCT/KR2008/000108, filed Jan. 8, 2008, and claims priority to Korean Patent Application Numbers: 10-2007-0002051, filed Jan. 8, 2007, and 10-2007-0002055, filed Jan. 8, 2007, both of which are hereby incorporated by reference herein in its entirety.

The present invention relates to a linear motor for a linear compressor reciprocating a moving member linearly inside a stationary member to compress refrigerant, and more particularly, to a linear motor for a linear compressor capable of decreasing an iron loss of a flux generated when a current flows in a coil and increasing an inductance.

BACKGROUND ART

Generally, in a linear compressor, a compression space into/from which an operation gas is sucked and discharged is defined between a piston and a cylinder, and the piston is reciprocated linearly inside the cylinder to compress the refrigerant.

As the linear compressor includes a component for converting a rotation force of a driving motor into a linear reciprocation force of the piston, such as a crank shaft, a large mechanical loss is caused by the motion conversion. Recently, researches have been made to solve the above problem.

In the linear compressor, a piston is coupled directly to a linearly-reciprocating linear motor, so that a mechanical loss caused by the motion conversion is prevented. Therefore, the linear compressor can improve the compression efficiency and simplify the configuration. In addition, power inputted to the linear motor is regulated to control an operation of the linear motor, so that noise is less generated than in the other compressors. Accordingly, the linear compressor has been mostly used in an electric home appliance installed in an indoor space, such as a refrigerator.

Figure 1:
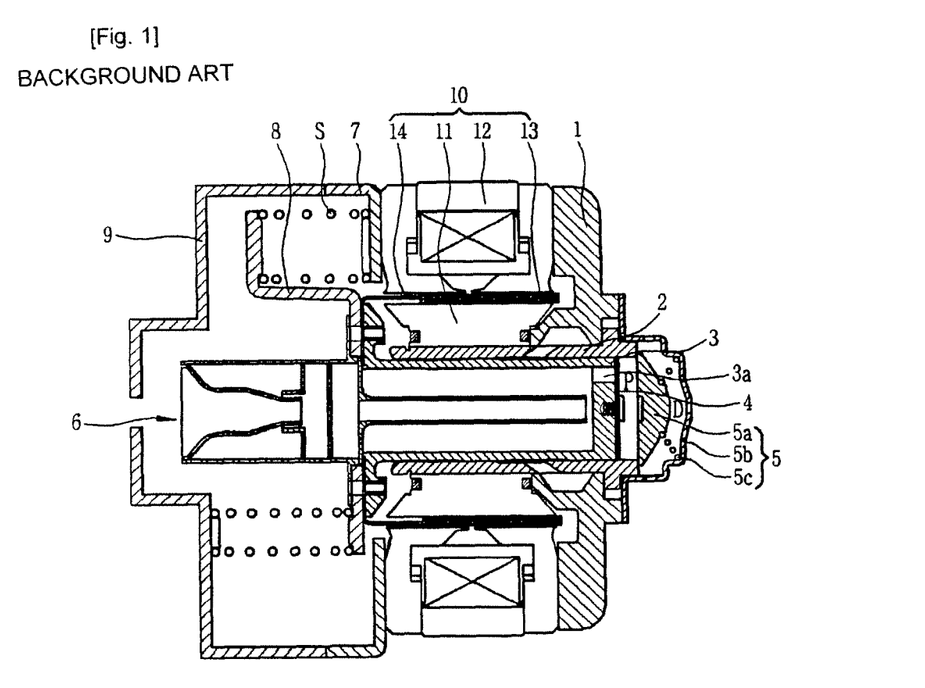
FIG. 1 is a view illustrating one example of a conventional linear compressor.
Figure 2:
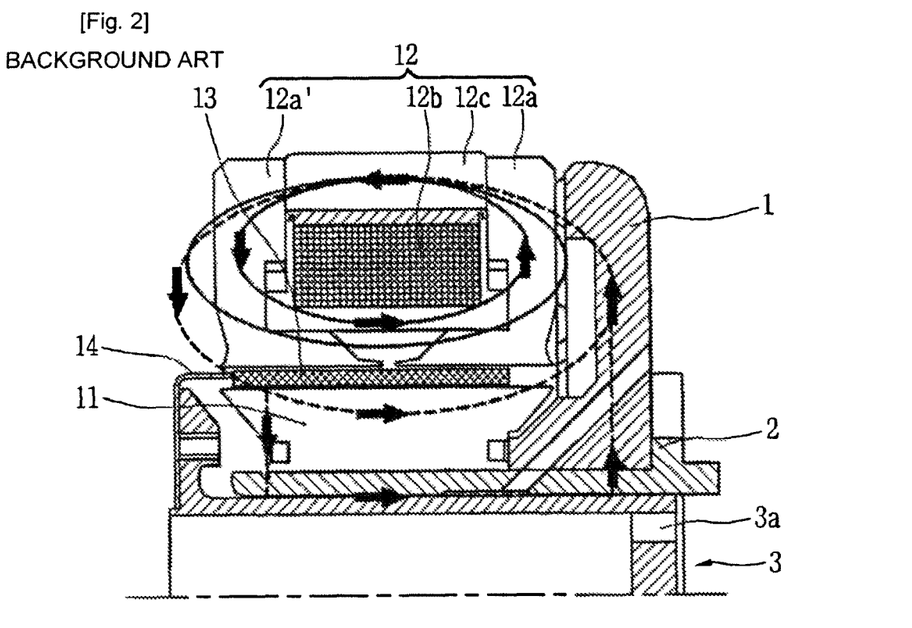
FIG. 2 is a view illustrating major portions of the one example of the conventional linear compressor.
Figure 3:
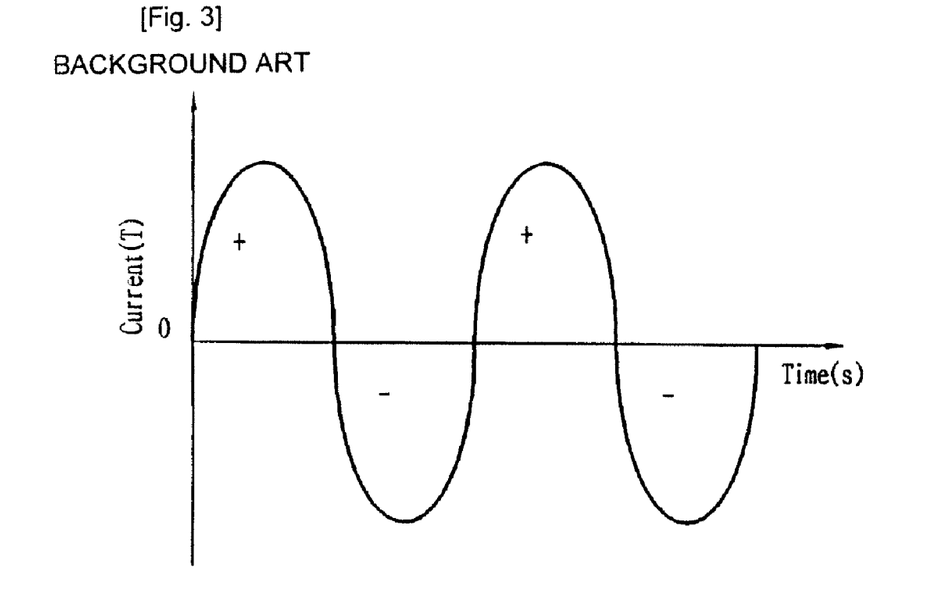
FIG. 3 is a graph showing a current supplied to a linear motor of FIG. 2.
Figure 4:
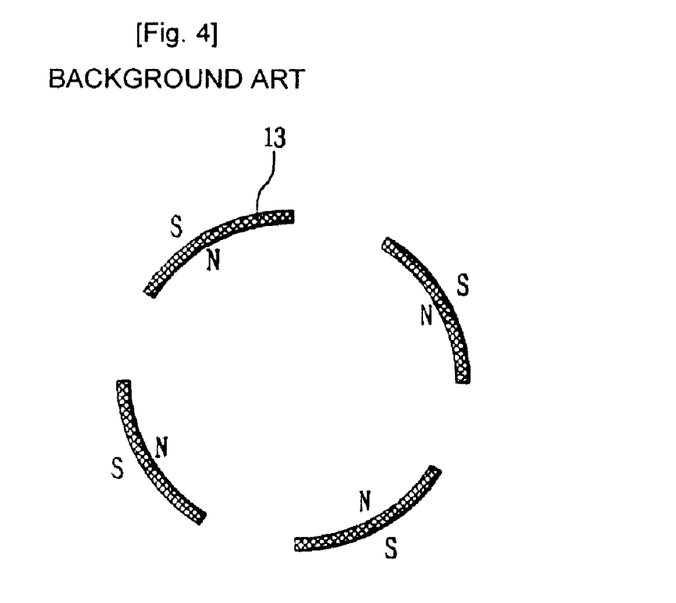
FIG. 4 is a view illustrating the polar arrangement of the linear motor of FIG. 2.

FIG. 1 is a view illustrating one example of a conventional linear compressor, FIG. 2 is a view illustrating major portions of the one example of the conventional linear compressor, FIG. 3 is a graph showing a current supplied to a linear motor of FIG. 2, and FIG. 4 is a view illustrating the polar arrangement of the linear motor of FIG. 2.

Referring to FIGS. 1 and 2, in the one example of the conventional linear compressor, a structure composed of a frame 1, a stationary member 2, a moving member 3, a suction valve 4, a discharge valve assembly 5, a muffler assembly 6, a motor cover 7, a supporter 8, a main body cover 9, a buffering spring (not shown) and a linear motor 10 is installed inside a shell (not shown) to be elastically supported.

In detail, the stationary member 2 is formed in a hollow shape with both open ends. One end of the stationary member 2 is fitted into and fixed to the frame 1, and blocked by the discharge valve assembly 5. The discharge valve assembly 5 includes a discharge valve 5a, a discharge cap 5b and a discharge valve spring 5c. After vibration and noise of refrigerant discharged from the discharge cap 5b are reduced through a loop pipe (not shown), the refrigerant is discharged to the outside through an outflow tube (not shown) on the shell side.

The moving member 3 is formed in a hollow shape with one blocked end. The blocked end of the moving member 3 is inserted into the stationary member 2. A compression space P is defined between the stationary member 2 and the moving member 3. A plurality of suction holes 3a are formed in the blocked end of the moving member 3 so that refrigerant can be sucked into the compression space P therethrough.

The suction valve 4 is fixed to the blocked end of the moving member 3 to open and close the suction holes 3a of the moving member 3 according to pressure variations of the compression space P.

The muffler assembly 6 is formed at one open end of the moving member 3 to be elongated in a motion direction, and partitioned off into various spaces. Therefore, as refrigerant flows through each space, a pressure and a flow rate of the refrigerant are changed to reduce noise.

The motor cover 7 supports the linear motor 10 in an axis direction to fix the linear motor 10, and is bolt-fixed to the frame 1. The main body cover 9 is coupled to the motor cover 7 in an axis direction.

A predetermined suction hole is formed in the main body cover 9 so that refrigerant introduced from an inflow tube on the shell side can pass therethrough.

The supporter 8 is installed between the motor cover 7 and the main body cover 9 coupled thereto. The supporter 8 is fixed to the open end of the moving member 3. While the moving member 3 reciprocates linearly, the supporter 8 is elastically supported in an axis direction on the motor cover 7 and the main body cover 9 by the buffering springs.

Referring to FIG. 2, the linear motor 10 includes a cylindrical inner stator 11 fixed to the outside of the stationary member 2, an outer stator 12 disposed in a radius direction at a predetermined interval, and having one end supported on the frame 1 and the other end supported on the motor cover 7, a permanent magnet 13 installed between the inner stator 11 and the outer stator 12 with a predetermined gap, and a connection member 14 for connecting the moving member 3 to the permanent magnet 13.

While the inner stator 11 is formed by stacking laminations in a circumference direction, the outer stator 12 is formed by interlocking core blocks 12a and 12a' on an outer circumferential surface of a coil wincing 12b wound in a circumference direction at a predetermined interval, and fixing the core blocks 12a and 12a' to the coil wincing 12b by an insert-injected matter 12c.

The operation of the conventional linear compressor will be described.

When input power is applied to the linear motor 10, as shown in FIG. 3, a current flows in the coil wincing 12b of the outer stator 12 with an AC waveform, and a flux alternates in +/− directions. Here, the inner stator 11, the outer stator 12 and the permanent magnet 13 generate a mutual electromagnetic force.

Referring to FIG. 4, the inner stator 11 and the outer stator 12 are repeatedly magnetized as N-S or S-N poles around the permanent magnet 13. The attractive and repulsive forces are operated between the poles (N-S) of the permanent magnet 13 and the magnetized poles of the inner stator 11 and the outer stator 12, so that the permanent magnet 13 reciprocates linearly.

Therefore, when the permanent magnet 13, the moving member 3 connected thereto, and the muffler assembly 6 reciprocate linearly, a pressure inside the compression space P is varied, so that the operations of the suction valve 4 and the discharge valve assembly 5 are automatically controlled. During the above operation, the refrigerant is sucked into the compression space P via the inflow tube on the shell side, the opening portion of the main body cover 9, the muffler assembly 6 and the suction holes 3a of the moving member 3, compressed in the compression space P, and discharged to the outside through the discharge cap 5b, the loop pipe and the outflow tube on the shell side.

In the conventional linear compressor, the coil wincing is installed inside the core blocks of the outer stator. When a current flows in the coil wincing, a flux is generated at an inner portion of the outer stator, i.e., around the coil wincing the to a mutual electromagnetic force. The flux flows through the frame made of steel, the stationary member, the moving member and the inner stator. Here, an iron loss occurs in sane of the flux flowing through the frame, the stationary member and the moving member, so that the efficiency of the linear motor is degraded.

In order to solve the foregoing problem, the frame, the stationary member and the moving member may be made of a non-magnetic material intercepting the flow of the flux. However, this method results in high cost and low productivity.

DISCLOSURE OF INVENTION

Technical Problem

The present invention is conceived to solve the aforementioned problems in the prior art. An object of the present invention is to provide a linear motor for a linear compressor capable of reducing an iron loss of a flux generated around a coil merely by changing a coil wincing position.

Another object of the present invention is to provide a linear motor for a linear compressor capable of increasing an inductance by regulating a coil turn direction.

Technical Solution

According to an aspect of the present invention, there is provided a linear motor for a linear compressor, inducing: an inner stator formed by stacking core blocks in a circumference direction to be insulated from each other; an outer stator formed by arranging core blocks in a circumference direction at predetermined intervals, and wincing a coil around the core blocks; and a plurality of permanent magnets formed between the inner stator and the outer stator with a predetermined gap, and reciprocated linearly the to a mutual electromagnetic force.

According to another aspect of the present invention, the core blocks of the inner stator, the core blocks of the outer stator and the permanent magnets are provided in the same number to correspond to each other.

According to a further aspect of the present invention, the core blocks of the inner stator adjacent in the circumference direction have different poles, the core blocks of the outer stator adjacent in the circumference direction have different poles, and the core blocks of the inner stator and the outer stator corresponding to each other have different poles.

According to a still further aspect of the present invention, the inner stator further includes a thin insulation segment installed between the core blocks to prevent a flow of a circumference direction flux of the core blocks.

According to a still further aspect of the present invention, the insulation segment is nude of a plastic material.

According to a still further aspect of the present invention, one coil is wound around inner and outer circumferences of the core blocks of the outer stator, respectively.

According to a still further aspect of the present invention, the coil is wound around the core blocks of the outer stator so that the adjacent core blocks can have opposite current directions.

According to a still further aspect of the present invention, the coil of the outer stator is wound around inner and outer circumferences of the core blocks, respectively.

According to a still further aspect of the present invention, the outer stator further includes hollow core guides installed to surround the core blocks, respectively, a coil being wound around outer circumferential surfaces thereof.

According to a still further aspect of the present invention, each of the core guides includes extension portions extended from both ends in a radius direction to secure an installation space of the coil.

According to a still further aspect of the present invention, the core guides are nonconductors.

According to a still further aspect of the present invention, a pair of core blocks are assembled in each core guide in an axis direction.

According to a still further aspect of the present invention, the coil of the outer stator is wound around a portion of the core block farthest from the inner stator.

According to a still further aspect of the present invention, a core guide of a non-magnetic material is positioned between the coil and the core block of the outer stator.

According to a still further aspect of the present invention, the coil of the outer stator is wound in an opposite direction to the coil wound around the adjacent core block.

Advantageous Effects

According to the present invention, a linear motor for a linear compressor includes an outer stator formed by wincing a coil around inner and outer portions of a core block, an inner stator, and a permanent magnet. Therefore, when a current flows in the coil, a flux is generated at a relatively outer portion of the outer stator. This configuration can reduce an iron loss of the flux generated when the flux passes through the inner stator and members positioned inside the inner stator, and can improve the efficiency of the linear motor.

In addition, according to the present invention, a linear motor for a linear compressor can reduce an iron loss of a flux merely by changing an installation position of a coil. This configuration serves to cut down a cost and improve the productivity.

Moreover, according to the present invention, a linear motor for a linear compressor can increase an inductance by regulating a turn direction of a coil wound around core blocks arranged in a circumference direction at predetermined intervals. This configuration improves the efficiency of the linear motor.

MODE FOR THE INVENTION

Hereinafter, preferred embodiments of the present invention will be described in detail with reference to the accompanying drawings.

Figure 5:
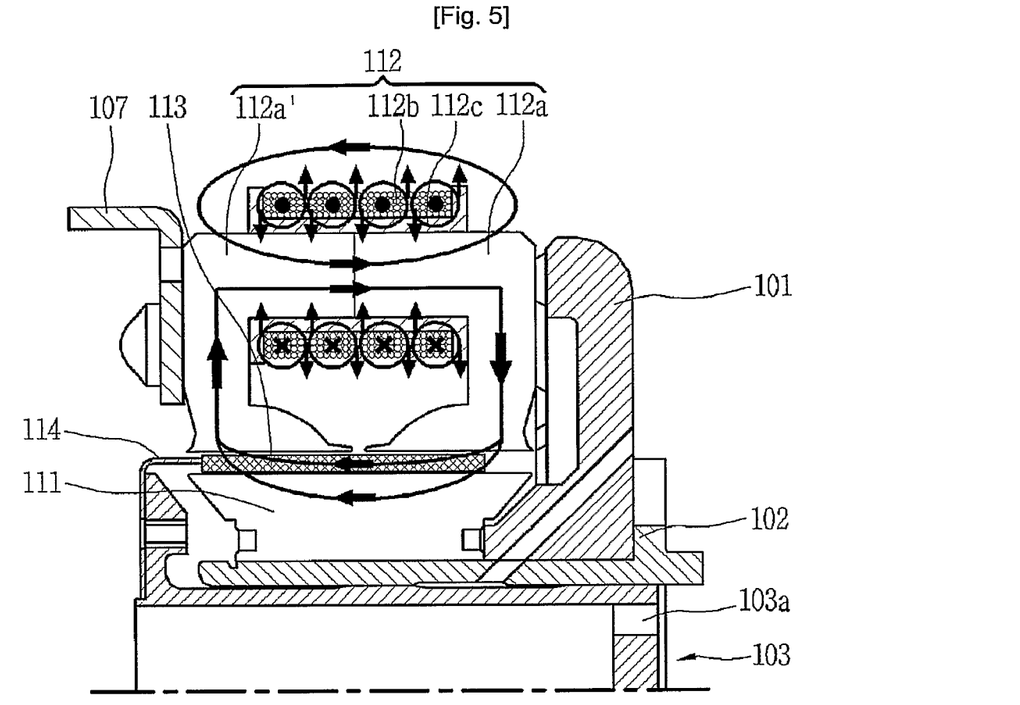
FIG. 5 is a view illustrating major portions of a linear compressor according to an embodiment of the present invention.
Figure 6:
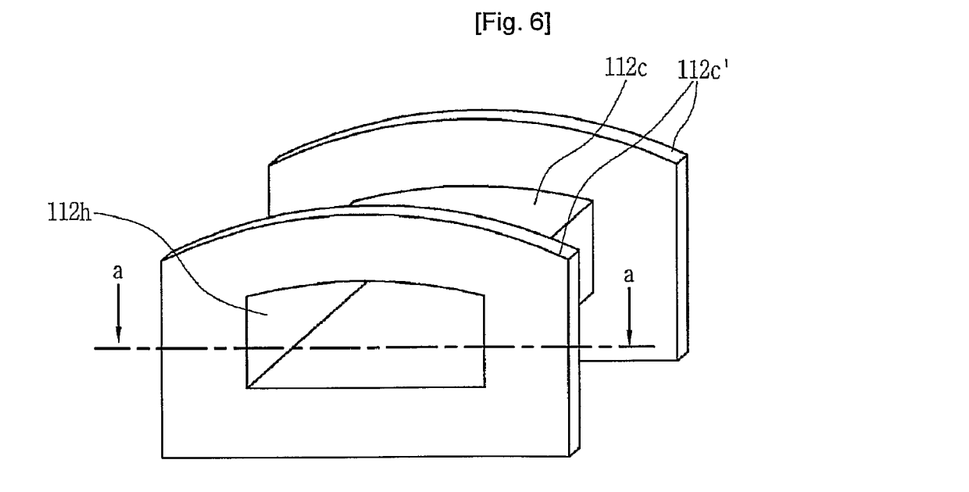
FIG. 6 is a view illustrating major portions of the linear compressor according to the embodiment of the present invention.
Figure 7:
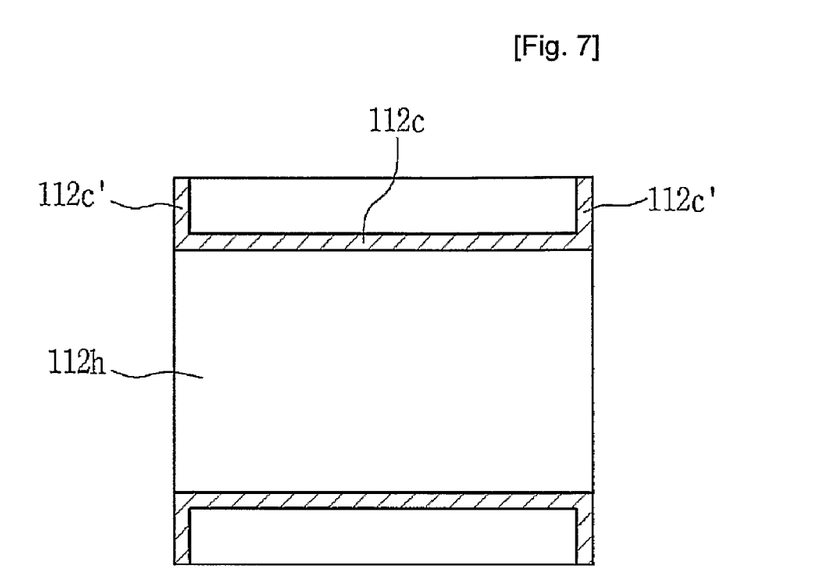
FIG. 7 is a view illustrating a guide applied to an outer stator of FIG. 5.
Figure 8:
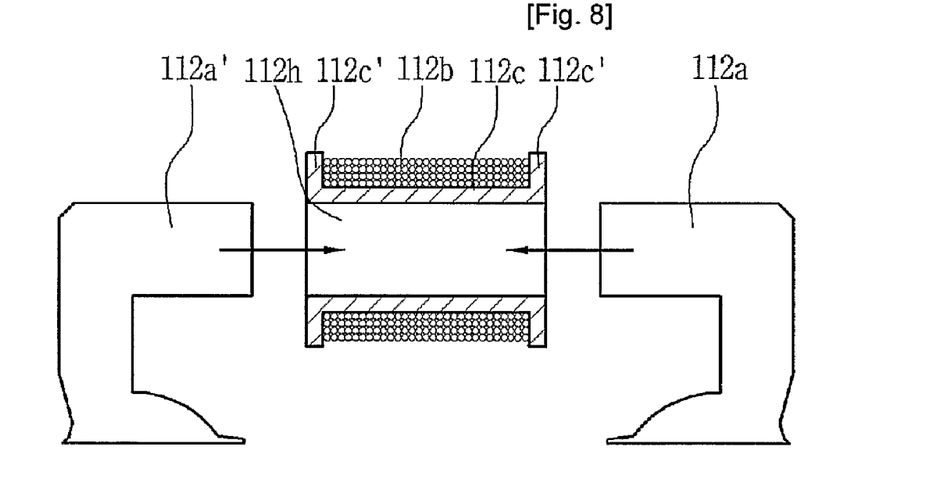
FIG. 8 is a sectional view taken along line a-a of FIG. 6.
Figure 9:
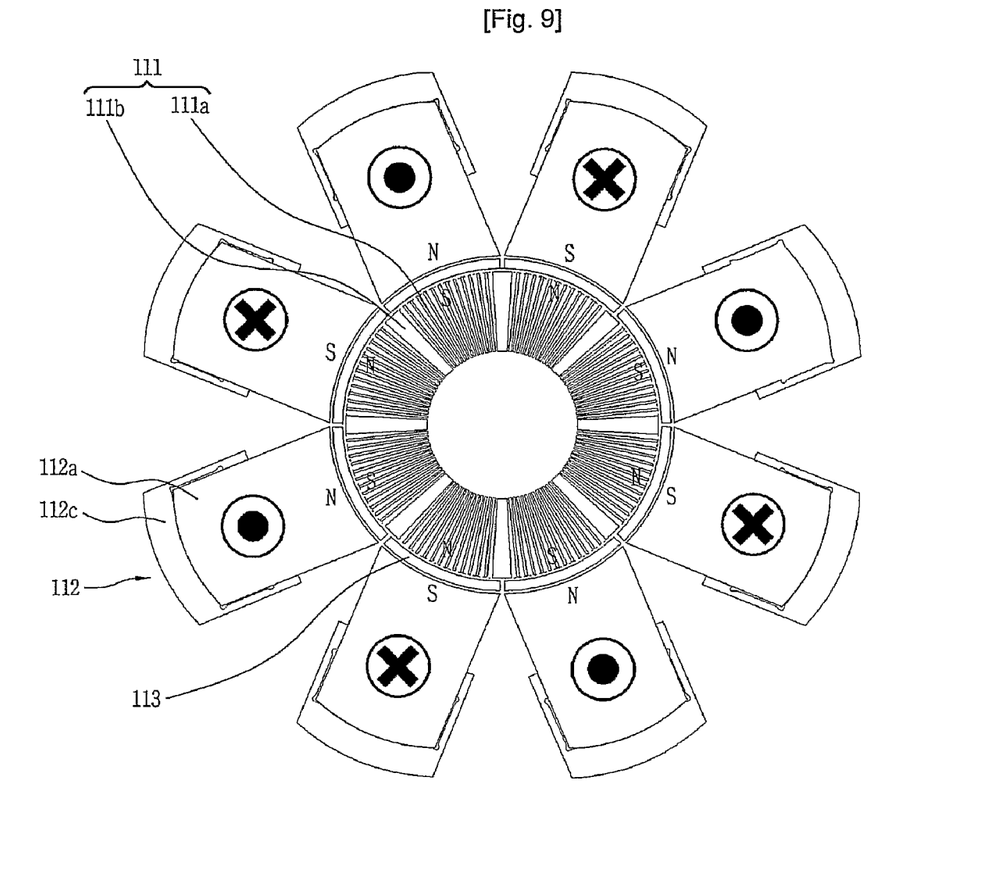
FIG. 9 is a view illustrating a linear motor of FIG. 5.
Figure 10:
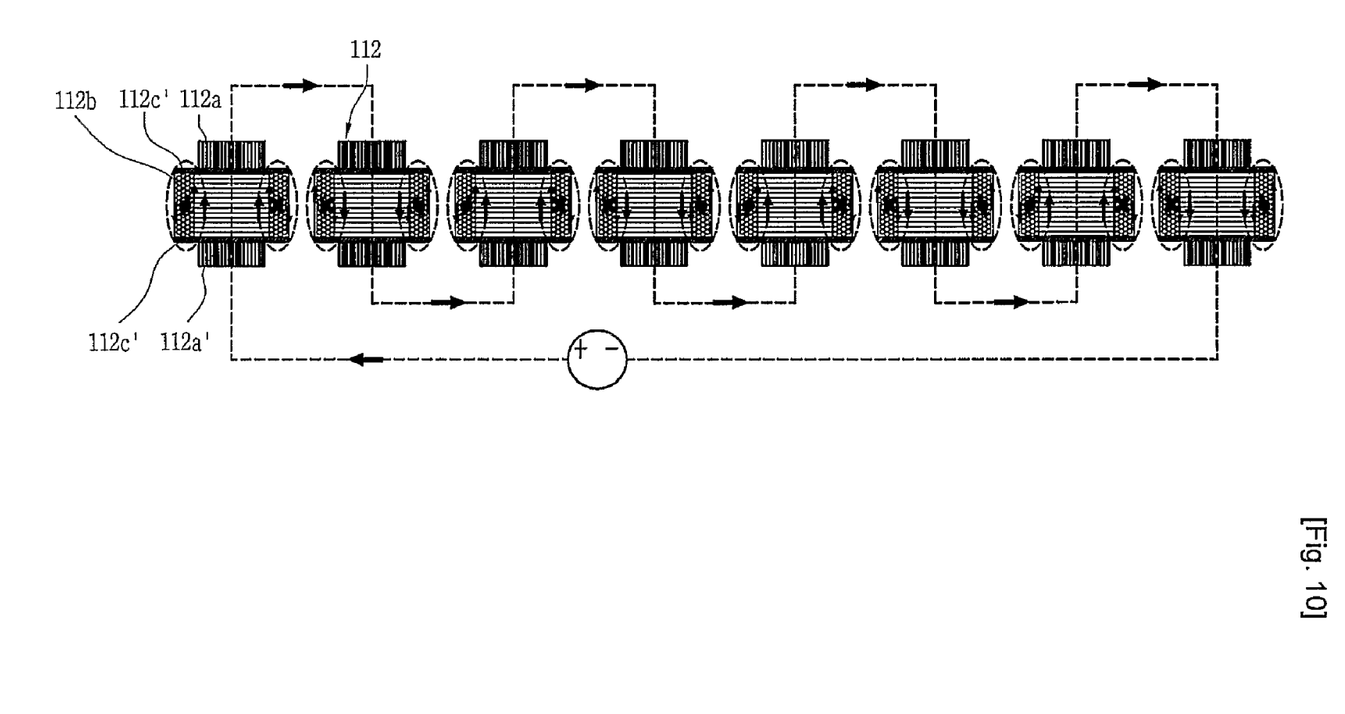
FIG. 10 is a view illustrating the outer stator of FIG. 5.

FIG. 5 is a view illustrating major portions of a linear compressor according to an embodiment of the present invention, FIG. 6 is a view illustrating major portions of the linear compressor according to the embodiment of the present invention, FIG. 7 is a view illustrating a guide applied to an outer stator of FIG. 5, FIG. 8 is a sectional view taken along line a-a of FIG. 6, FIG. 9 is a view illustrating a linear motor of FIG. 5, and FIG. 10 is a view illustrating the outer stator of FIG. 5.

Referring to FIGS. 5 and 9, the linear compressor according to the embodiment of the present invention includes a frame 101, a stationary member 102, a moving member 103, a motor cover 107, and a linear motor. The linear motor includes an inner stator 111, an outer stator 112, a permanent magnet 113 and a connection member 114.

The frame 101, the stationary member 102, the moving member 103 and the motor cover 107 are identical to those of the conventional linear compressor, and thus detailed explanations thereof are omitted.

In detail, in the inner stator 111, core blocks 111a formed by stacking laminations are arranged in a circumference direction to be insulated from each other. To this end, thin insulation segments 111b are installed between the core blocks 111a as large as the laminations.

In the inner stator 111, grooves (not shown) are formed in both ends of the core blocks 111a and the insulation segments 111b and O-rings are inserted thereinto, so that the core blocks 111a and the insulation segments 111b are connected in a circumference direction. One end of the inner stator 111 is supported on the frame 101, and the other end thereof is supported on an outer circumferential surface of the stationary member 102 by means of a C-ring.

The core blocks 111a are made of a material with a small resistance even if a flux induced by a current flows therein. Meanwhile, the insulation segments 111b are made of an insulation material so as to prevent the flux induced by the current from flowing in the circumference direction of the core blocks 111a. For example, eight core blocks 111a may be provided, and insulation segments 111b may be made of a plastic material and installed between the core blocks 111a.

In addition, the core blocks 111a of the inner stator 111 are magnetized the to a flux induced when a current flows in the outer stator 112. Here, the adjacent core blocks 111a are magnetized to have afferent poles N-S. When AC power is inputted, the flux induced by the current is changed in +/− directions, and the poles N-S magnetized in the adjacent core blocks 111a are varied.

The permanent magnet 113 is provided in the same number as that of the core blocks 111a of the inner stator 111, and installed in a circumference direction at predetermined intervals to correspond to the core blocks 111a. The permanent magnets 113 are connected to the moving member 103 by the connection member 114, and reciprocated linearly in an axis direction.

If the permanent magnet 113 has N pole in the direction of the inner stator 111, it has S pole in the direction of the outer stator 112.

Referring to FIGS. 8 and 10, the outer stator 112 includes core blocks 112a and 112a', a coil 112b and a core guide 112c. The coil 112b is wound around inner and outer circumferences of the core blocks 112a and 112a'. The outer stator 112 is arranged in a racks direction of the inner stator 111 at a predetermined interval.

The core blocks 112a and 112a' are made of a material with a small resistance even if a flux induced by a current flows therein, and formed by stacking '¬'-shaped laminations. Meanwhile, the core guide 112c is made of a non-conductor material so that a current cannot flow therethrough even if the coil 112b is wound thereon. As shown in FIGS. 6 and 7, an opening portion 112h is formed in the center of the core guide 112c so that the pair of core blocks 112a and 112a' can be inserted thereinto in an axis direction. In addition, extension portions 112c' are formed at both ends of the core guide 112c to extend in a racks direction.

A process of manufacturing the outer stator 112 will be described. The pair of '¬'-shaped core blocks 112a and 112a' are press-fit into the core guide 112c in an axis direction. As shown in FIG. 8, the pair of core blocks 112a and 112a' are interlocked with each other to define a '⊏'shape with the core guide 112c. The coil 112b is wound around the core guide 112c to constitute a unit. Such units are arranged in a circumference direction at predetermined intervals.

Here, the core blocks 112a and 112a' of the outer stator 112 are provided in the same number as that of the core blocks 111a of the inner stator 111 and the permanent magnets 113, and installed in a circumference direction at predetermined intervals. A winding direction of the coil 112b is regulated to cause a current induced by the coil 112b to flow in opposite directions in the adjacent units.

The outer stator 112 is installed between the frame 101 and the motor cover 107. As the outer stator 112 is formed of the units coupled merely by the coil 112b, it is difficult to assemble the units at a time. Therefore, the units are fitted and fixed between the frame 101 and the motor cover 107 at a time by means of a separate assembly guide (not shown), and then the assembly guide is taken out.

When the linear motor manufactured by the above process is operated, a current flows in the coil 112b, so that a mutual electromagnetic force is generated by the inner stator 111, the outer stator 112 and the permanent magnets 113. The moving member 103 is reciprocated linearly by the permanent magnets 113.

As compared with the prior art, the center of the coil 112b moves to the outside of the core blocks 112a and 112a'. Accordingly, a flux generated by the current flowing through the coil 112b less flows through the stationary member 102 and the moving member 103 close to an axis direction center.

Figure 11:
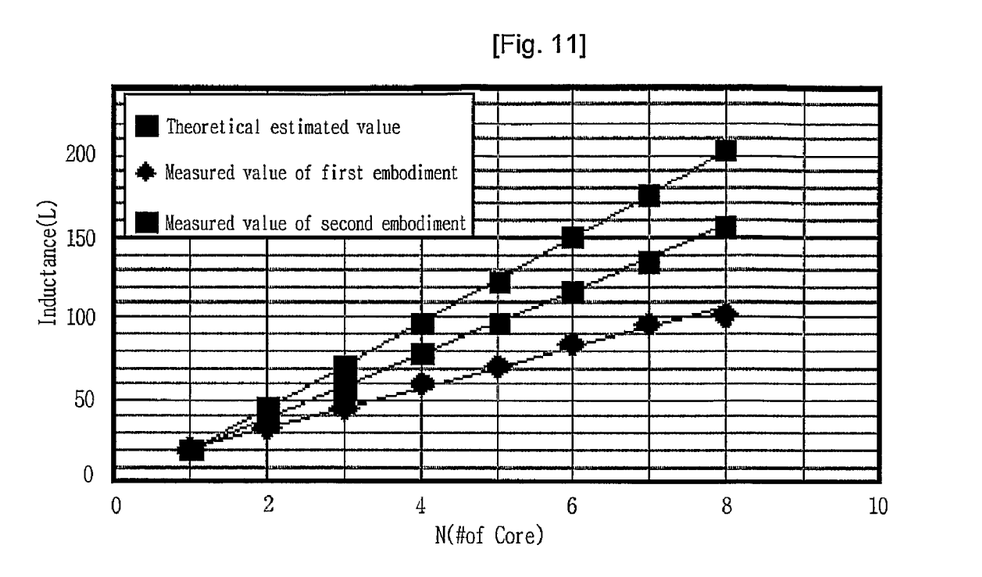
FIG. 11 is a graph showing inductances varied by the coil turn number in linear motors according to various embodiments of the present invention.

A first embodiment wherein a current induced to cores of an outer stator adjacent in a circumference direction flows in the same direction will be compared with a second embodiment wherein a current induced to cores of an outer stator adjacent in a circumference direction flows in opposite directions. Referring to FIG. 11, an actual inductance value of the second embodiment is higher than an actual inductance value and a theoretical estimated inductance value of the first embodiment.

As the number of the cores of the outer stator increases, the actual inductance value of the second embodiment is higher than the actual inductance value and the theoretical estimated inductance value of the first embodiment. For example, in case of an outer stator with eight cores, the actual inductance value of the second embodiment and the actual inductance value and the theoretical estimated inductance value of the first embodiment are 202.08 (mL), 102.35 (mL) and 157.06 (mL), respectively. That is, the inductance value of the second embodiment is more increased than the inductance value of the first embodiment by 99.8% and the theoretical estimated inductance value of the first embodiment by 28.66%. It means that the second embodiment reduces an iron loss of a flux more than the first embodiment by 99.9% and the theoretical first embodiment by 28.66%.

$$\frac{n_s}{n_t} = \sqrt{\frac{L_s}{L_t}}$$ [Formula 1]

In the above formula 1, $n_t$ represents a coil turn number of the first embodiment, $n_s$ represents a coil turn number of the second embodiment, $L_t$ represents an inductance value of the first embodiment, and $L_s$ represents an inductance value of the second embodiment. Here, the inductance value $L_t$ and $L_s$ is proportional to the square of the coil turn number $n_t$ and $n_s$.

Accordingly, in case of an outer stator with eight cores, when 157.06 (mL) and 202.08 (mL) are substituted for the inductance value $L_t$ of the first embodiment and the inductance value $L_s$ of the second embodiment in the above formula 1, the coil turn number $n_s$ of the second embodiment is 1.4 times as large as the coil turn number $n_t$ of the first embodiment. As a result, the coil turn number $n_s$ of the second embodiment can be reduced more than the coil turn number $n_t$ of the first embodiment by about 40% to obtain the same inductance value.

Although the present invention has been illustrated and described in connection with the accompanying drawings and the preferred embodiments, the scope of the present invention is not limited thereto but defined by the appended claims.

The invention claimed is:

1. A linear motor for a linear compressor, comprising:
a plural of permanent magnets positioned in a circumference direction at a predetermined interval;
an inner stator positioned inside circumference of the plurality of permanent magnets with a predetermined gap, to be formed by stacking a plurality of first core blocks in a circumference direction to be insulated from each other; and
an outer stator positioned outside circumference of the plurality of permanent magnets with a predetermined gap, to be formed by arranging a plurality of second core blocks in a circumference direction at predetermined intervals, and winding a coil around the second core blocks of the outer stator, wherein the coil is wound around inner and outer circumferences of each second core block along a longitudinal direction of the permanent magnet so that the coil winding may overlap a longitudinal center of the plurality of permanent magnets;
wherein the plurality of permanent magnets are reciprocated linearly between the inner stator and the outer stator due to a mutual electromagnetic force with the inner stator and the outer stator.

2. The linear motor for the linear compressor of claim 1, wherein the first core blocks of the inner stator, the second core blocks of the outer stator and the permanent magnets are provided in the same number to correspond to each other.

3. The linear motor for the linear compressor of claim 1, wherein the first core blocks of the inner stator adjacent in the circumference direction have different poles alternately, the second core blocks of the outer stator adjacent in the circumference direction have different poles alternately, and the core blocks of the inner stator and the outer stator corresponding to each other have different poles.

4. The linear motor for the linear compressor of claim 1, wherein the inner stator further comprises a thin insulation segment installed between the first core blocks to prevent a flow of a circumference direction flux of the first core blocks.

5. The linear motor for the linear compressor of claim 4, wherein the insulation segment is made of a plastic material.

6. The linear motor for the linear compressor of claim 1, wherein a single coil is used in winding the coil around inner and outer circumferences of each second core block of the outer stator.

7. The linear motor for the linear compressor of claim 1, wherein the coil is wound around the second core blocks of the outer stator so that the adjacent second core blocks can have opposite current directions.

8. The linear motor for the linear compressor of claim 1, wherein the outer stator further comprises hollow core guides installed to surround the second core blocks, respectively, the coil being wound around outer circumferential surfaces thereof.

9. The linear motor for the linear compressor of claim 8, wherein each of the core guides comprises extension portions extended from both ends in a radius direction to secure an installation space of the coil.

10. The linear motor for the linear compressor of claim 8, wherein the core guides are non-conductors.

11. The linear motor for the linear compressor of claim 8, wherein a pair of core blocks are assembled in each core guide in an axis direction, to form each of the second core blocks.

12. The linear motor for the linear compressor of claim 1, wherein the coil of the outer stator is wound around a portion of the second core block farthest from the inner stator.

13. The linear motor for the linear compressor of claim 12, wherein a core guide of a non-magnetic material is positioned between the coil and the second core block of the outer stator.

14. The linear motor for the linear compressor of claim 12, wherein the coil of the outer stator is wound in an opposite direction to the coil wound around the adjacent second core block.

* * * * *